(12) United States Patent
Haer et al.

(10) Patent No.: US 11,996,695 B2
(45) Date of Patent: *May 28, 2024

(54) PHOTOVOLTAIC DISCONNECT

(71) Applicant: Lunar Energy, Inc., Mountain View, CA (US)

(72) Inventors: Jason Jaspreet Singh Haer, San Francisco, CA (US); Conrad Xavier Murphy, Piedmont, CA (US)

(73) Assignee: Lunar Energy, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,844

(22) Filed: Nov. 7, 2022

(65) Prior Publication Data

US 2023/0170707 A1    Jun. 1, 2023

Related U.S. Application Data

(63) Continuation of application No. 17/380,548, filed on Jul. 20, 2021, now Pat. No. 11,522,366.

(51) Int. Cl.
*H02J 3/38*     (2006.01)
*H02J 3/32*     (2006.01)

(52) U.S. Cl.
CPC ............... *H02J 3/381* (2013.01); *H02J 3/32* (2013.01); *H02J 2300/24* (2020.01)

(58) Field of Classification Search
CPC .......... H02J 3/381; H02J 3/32; H02J 2300/24
USPC ........................................................ 307/85
See application file for complete search history.

(56) References Cited

U.S. PATENT DOCUMENTS

| | | | |
|---|---|---|---|
| 2011/0169344 A1* | 7/2011 | Suekane | H02J 3/381 307/151 |
| 2017/0033564 A1* | 2/2017 | Lin | H02S 40/32 |
| 2019/0027617 A1* | 1/2019 | Varlan | H02S 50/10 |
| 2019/0165552 A1* | 5/2019 | Kin | H05K 7/1432 |
| 2020/0119561 A1* | 4/2020 | McMorrow | H02M 3/04 |
| 2020/0169217 A1 | 5/2020 | Kenzou | |
| 2020/0259336 A1* | 8/2020 | Rao | B60L 53/60 |
| 2021/0169217 A1* | 6/2021 | Hazzard | F16M 11/28 |
| 2022/0200287 A1* | 6/2022 | Endo | H02J 3/003 |

FOREIGN PATENT DOCUMENTS

CN          206594270       * 10/2017

* cited by examiner

*Primary Examiner* — Daniel Cavallari
*Assistant Examiner* — Dru M Parries
(74) *Attorney, Agent, or Firm* — Van Pelt, Yi & James LLP

(57) ABSTRACT

A power system includes an integrated energy storage system (ESS). It further includes a photovoltaic (PV) source. It further includes an integrated inverter having power connections to both the energy storage system and the photovoltaic source. The inverter includes an integrated PV disconnect switch.

5 Claims, 3 Drawing Sheets

PHOTOVOLTAIC DISCONNECT

CROSS REFERENCE TO OTHER APPLICATIONS

This application is a continuation of U.S. patent application Ser. No. 17/380,548, entitled PHOTOVOLTAIC DISCONNECT filed Jul. 20, 2021 which is incorporated herein by reference for all purposes.

BACKGROUND OF THE INVENTION

The existing power system ecosystem is fragmented, including myriad components and systems provided by different entities that must be combined together. Due to this fragmentation, installing and controlling existing power systems is complex and challenging.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
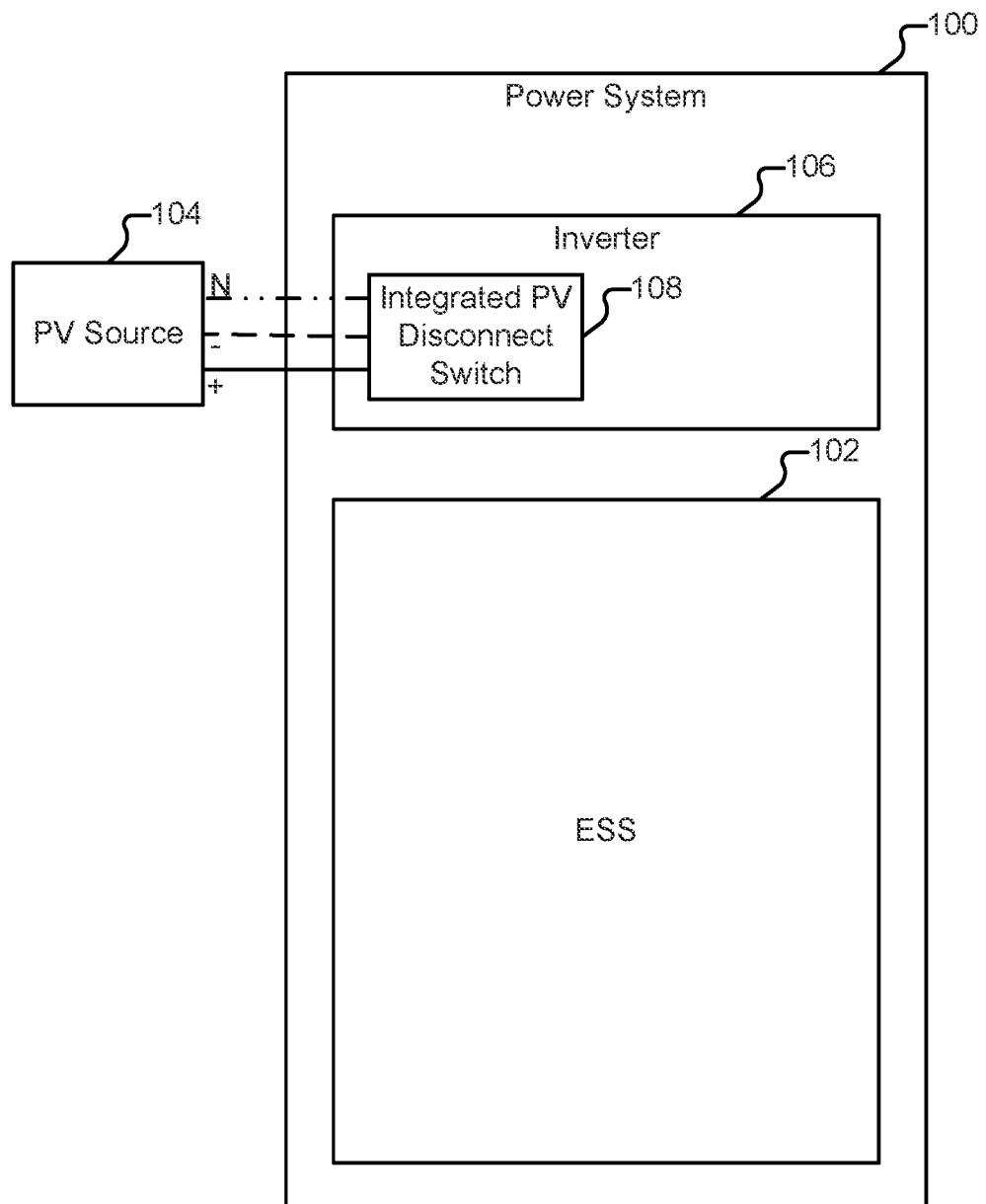
FIG. 1 illustrates an embodiment of a power system.

FIG. 1 illustrates an embodiment of a power system. Power system 100 includes an integrated energy storage system (ESS) 102, such as batteries or other types of energy storage. The power system also includes an integrated input for a photovoltaic (PV) source 104, such as an array of solar panels. As shown in this example, the power system also includes an integrated inverter 106 that has a bi-directional power connection from the ESS, as well as a connection to receive input power from the solar panels (i.e., the inverter includes multiple power interfaces for accepting both battery and solar power). To facilitate various disconnect functions (e.g., for safety during servicing, emergency situations, etc.), the inverter further includes an integrated Photovoltaic (PV) disconnect switch 108 for disconnecting the solar input. As shown in this example, the PV power from source 104 comes directly into the integrated disconnect switch 108 that is integrated into the inverter 106.

As will be described herein, with such a combined inverter that takes as input multiple power sources, and also includes an integrated PV disconnect switch, multiple types of disconnects may be facilitated in response to the actuation of the single, integrated PV disconnect switch, including:

Array Rapid Shutdown

PV Disconnect

ESS Disconnect

For example, as will be described below, in some embodiments, in addition to causing PV disconnect (that is, disconnecting an input of the inverter from the PV source), opening or activation of the single integrated PV disconnect switch triggers or initiates a set of actions that also satisfies the requirements of ESS disconnect and array rapid shutdown.

In the example of FIG. 1, the power system is a single integrated system. This is in contrast to existing power systems, which may have various components in different boxes or enclosures mounted on the wall that are assembled or plumbed together by conduit or field wires. For example, in contrast to the integrated power system described herein, existing power systems have separate PV systems that take only PV input, which then go to a different subsystem.

There are various benefits to the integrated power system described herein. For example, as described herein, multiple different types of functions that are to be manually disconnected, such as Rapid Shutdown, PV disconnect, ESS disconnect, and AC output disconnect, may be activated in response to the triggering of a single switch, such as the integrated PV disconnect switch. That is, in the integrated power system described herein, triggering of a single PV disconnect switch may in turn activate various actions that satisfy the requirements of not only PV disconnect, but other types of disconnects as well, such as ESS disconnect and rapid shutdown. Thus, as will be shown in further detail below, by having an integrated power system with an inverter that handles both solar and battery as inputs, and also has an integrated PV switch, multiple types of disconnects may be facilitated with one common switch (e.g., the integrated PV disconnect switch described herein).

Figure 2:
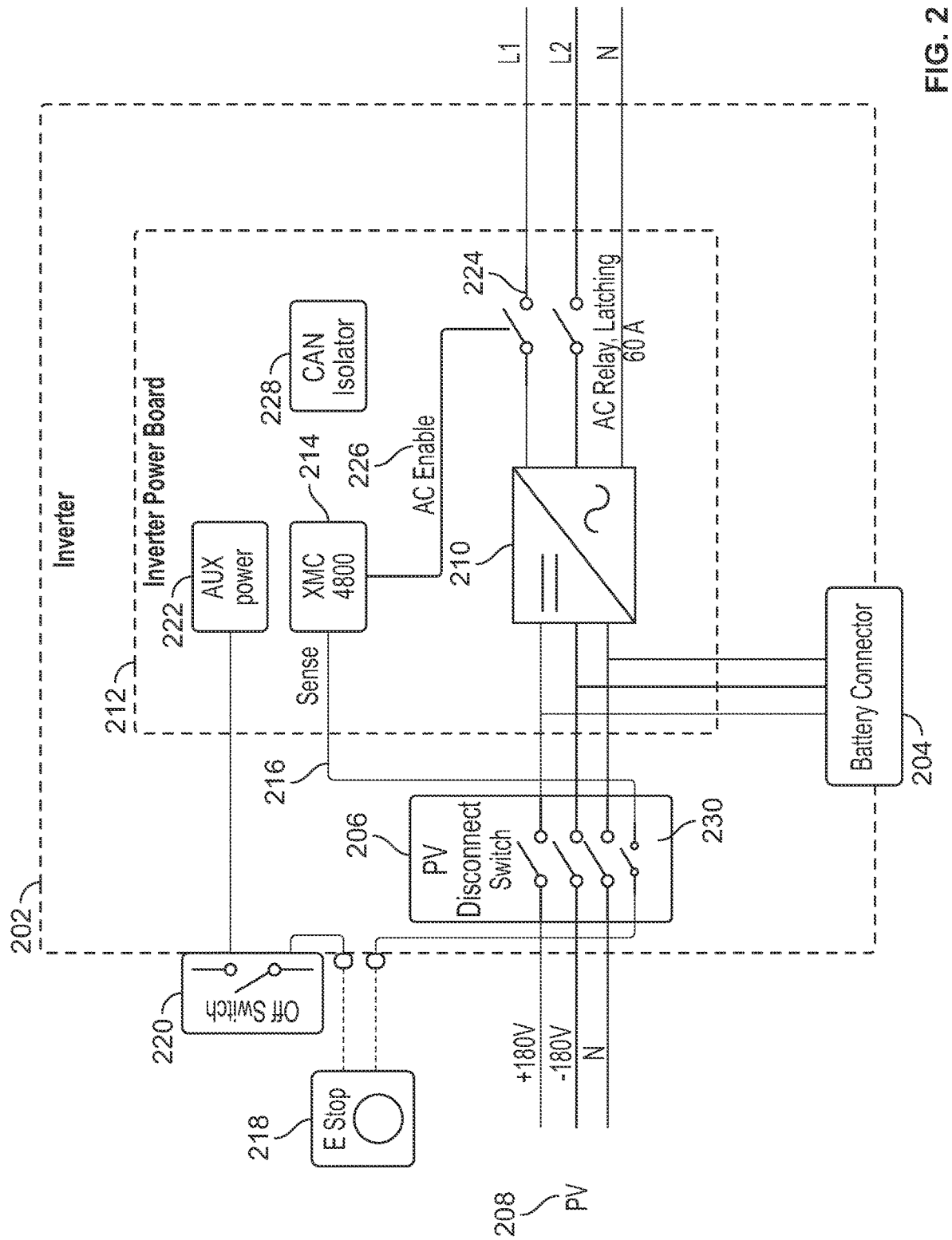
FIG. 2 illustrates an embodiment of a disconnect architecture.

FIG. 2 illustrates an embodiment of a disconnect architecture. A circuit diagram of the disconnect architecture is shown. The example of FIG. 2 includes inverter 202. In some embodiments, inverter 202 is an example of inverter 106 of FIG. 1. In this example, the inverter includes a battery connector 204, which connects to a battery or other type of energy store (e.g., ESS 102 of FIG. 1), and provides an interface by which the inverter receives DC (Direct Current) power from the energy storage system portion of the power system. Battery connector 204 is connected to power inverter circuit 210. The inverter 202 further includes CAN (Controller Area Network) Isolator 228.

As shown in this example, inverter 202 includes an integrated PV disconnect switch 206 (e.g., integrated PV disconnect switch 108 of FIG. 1). In some embodiments, the PV disconnect switch is a service disconnect that is internal to the inverter. In some embodiments, the integrated PV disconnect switch is lockable. In this example, the PV disconnect switch is a part of the inverter. In some embodiments, the integrated PV disconnect switch is within the same enclosure as the inverter. The PV disconnect switch described herein is integrated with the inverter without the use of field wiring to connect them. That is, there is an absence of field wiring in integrating the PV disconnect switch with the inverter and other components. As shown in this example, PV power source 208 is connected directly to the PV disconnect switch 206, where the switch is also connected to the input of power inverter circuit 210. Further details regarding the PV disconnect switch are described below.

Inverter 202 further includes inverter power board 212. Inverter power board 212 includes power inverter circuit 210. As shown in this example, the power inverter circuit takes as input both PV and battery DC power. The power inverter circuit is configured to create bi-directional DC to AC power, which is provided to a load (e.g., building such as a home) or to be stored in the ESS portion of the power system for later use.

Inverter power board 212 includes microcontroller 214. As will be described in further detail below, the microcontroller is configured with logic to detect an indication to initiate disconnect or shutdown (e.g., due to activation of one or more switches, such as the integrated PV disconnect switch), and in response, coordinate a sequence of actions to facilitate one or more types of disconnects. Other types of processors may also be used to facilitate disconnect and/or shutdown, as described herein.

As shown in this example, an input to microcontroller 214 is sense line 216. As shown in this example, the sense line passes through a number of switches that are in series: PV disconnect switch 206, e-stop switch 218, and local on/off switch 220, further details of which will be described below. The sense line connects to AUX power supply 222. In some embodiments, the AUX power supply provides a voltage signal (e.g., 12V or 24V low voltage signal). In some embodiments, the low voltage signal is implemented as a hardware interlock line. The use of a low voltage wire provides flexibility for installers with respect to installation and placement of the low voltage wire (e.g., when routing the sense line to the exterior of the building to facilitate a remote switch). In some embodiments, the microcontroller determines whether to initiate disconnect based on the signal or voltage detected on the sense line.

For example, the AUX power supply provides the power that runs through switches 206, 218, and 220. When the circuit for the sense line is complete (unbroken), the AUX power supply provides a voltage on the line (e.g., low voltage signal such as 12V or 24V signal). When the sense line is broken, the voltage on the sense line goes low (e.g., to 0V). Thus, the sense line will be in one of two states—a high state with > than 0V if the line is unbroken, and a low state (0V) if the line is broken. Opening of any of the switches 206, 2018, and 220 will cause the sense line to break, changing the state of the sense line 216 from high to low. Interruption of the sense line is detected/sensed by the inverter power board (by the microcontroller), where the microcontroller then takes the appropriate actions in response.

In some embodiments, in response to detecting the sense line going low (because at least one of the three switches 206, 218, and 220 has been opened), the microcontroller performs a set of actions, including dropping PV DC bus voltage, and disconnecting the output of the inverter. Dropping PV DC bus voltage and disconnecting the output of the inverter fulfill array rapid shutdown and ESS disconnect requirements, respectively. Thus, activation of a single switch causes multiple actions to be performed that satisfy requirements for multiple types of disconnects. In some embodiments, the microcontroller 214 is also configured to turn on/off the power inverter circuit 210.

In some embodiments, PV DC bus voltage is dropped via power optimizers. For example, a signal is sent by the microcontroller to optimizers in the PV array, instructing them to deactivate. This causes the PV source to be powered down, satisfying requirements of rapid shutdown.

In some embodiments, disconnecting the output of the inverter includes opening contacts to a main panel via AC relays. This satisfies the requirements for ESS disconnect. For example, the microcontroller is configured to control AC (Alternating Current) relays 224, which control whether the output of the power inverter circuit is delivered/connected to the load (e.g., building). The microcontroller controls the AC relays via AC enable line 226. In this way, the AC output of the inverter can be controlled by the microcontroller. In some embodiments, for reliability purposes, a latching AC relay is used, so that the latch does not require power to stay in any given state. That is, by using a latching AC relay, power may be removed, and the latch will stay in a state. Power may then be applied to switch states, where the latch will remain in the same state after removing power. This is in contrast to another type of component such as a solenoid that requires current flowing through it to stay engaged or disengaged. An example of a latching AC relay is the Omron G9TA.

As described above, in the example of FIG. 2, along sense line 216 are three switches that are in series: lockable PV disconnect 206, E Stop 218, and Local on/off switch 220. Opening of any of these switches causes the sense line to be broken, causing a change in the signal on the sense line, which is detected by microcontroller 214 and which, in response, facilitates disconnect by performing various actions. The following are further example details regarding switches 206, 218, and 220.

"E-Stop" or emergency stop Switch 218: In some embodiments, this switch is an external or remote activation switch. This external activation switch may be used, for example, when rapid shutdown is to be initiated. For example, if the power system is installed in a home (e.g., inside a garage), a remote e-stop switch is provided on the exterior or outside of a building for a firefighter to interact with.

In some embodiments, the e-stop switch is a remote switch that is placed externally (e.g., outside of the house), separate from the power system. The remote switch is tied to the enable line logic (sense line 216), allowing remote actuation of disconnect functions. Examples of functions that utilize the remote switch are described in further detail below. For example, the enable line goes external from its installation to the remote switch.

The e-stop switch may not be required if the power system is installed on the exterior of the house. For example, if the power system is installed on the exterior of the house, a firefighter may be instructed to initiate rapid shutdown by activating the PV disconnect switch.

As described above, in some embodiments, the e-stop switch is an example of a remote disconnect switch. In some embodiments, the remote disconnect switch, when in the closed position or state, passes a low voltage signal (e.g., supplied by Aux power 222). Opening of the remote disconnect switch causes the sense line to be broken. Breaking of the sense line is detected by microcontroller 214, which then performs a set of actions to facilitate disconnect/shutdown.

The remote switch may be wired and/or wireless. For example, the remote switch may be wired only. In other embodiments, the remote switch is wireless, with wired hardware redundancy.

Local On/Off Switch 220: In some embodiments, this local switch is also used to interrupt power. This, for example, is a switch that may be used by a user to turn off the power system. As shown in this example, the local on/off switch is inline with the sense line 216. Opening of the local on/off switch causes the sense line to be broken.

PV disconnect switch 206: The integrated PV disconnect switch is a service disconnect switch that is used to disconnect the PV power from the inverter. In this example, the PV disconnect switch is coupled with switch 230, which is inline with sense/enable line 216. Opening of the PV disconnect switch also causes switch 230 to open (which also causes the sense line to be broken). Closing the integrated PV disconnect switch causes switch 230 to close as well.

The PV disconnect switch (or access to the switch) is also lockable. This is to prevent the PV system from being accidentally turned back on during servicing, and is a safety mechanism provided for service personnel. The lockable PV disconnect allows lockout/tagout procedures, where the PV disconnect may be locked in an off position (e.g., where the AUX line is broken) for lockout/tagout.

The PV disconnect switch may be activated via various types of actions, such as a flip, rotational lever, pull out, etc. As one example, the switch includes two holes, where the switch may be manipulated to either align or misalign the holes. For example, when the PV disconnect switch is in the off state, the two holes are lined up, and a lock may be placed through the two holes, preventing the switch from being moved into the "on" position. That is, in the "on" state, the holes are misaligned, and in the "off" state, the holes become aligned and may be locked. An example of a lockable PV disconnect switch is the RS Pro 466144.

The PV disconnect switch is designed or configured to be able to open under load, and to break current flow. In some embodiments, having the inverter enable/sense line 216 and an integrated PV disconnect switch 206 allows for various optimizations. As one example, the integrated PV disconnect switch is implemented as a multi-stage switch, where, prior to opening of the connection between the PV source and the inverter, the enable line is first caused to be opened (e.g., switch 230 is caused to be opened first, before opening the switches or contacts connecting the positive, negative, and neutral lines of the PV source to the inverter). This in turn causes the sense line to break, where in response, the microcontroller drops PV DC bus voltage, as described above (e.g., by sending a signal to turn off power optimizers in the PV panels). In this way, the PV system is powered down before the PV disconnect switch (or connection between the PV source and the input of the inverter) is actually opened.

As the PV system is powered down first, the PV disconnect switch need not break under full load. Thus, the PV disconnect switch portion can be undersized, as it is not breaking load (because the inverter is not pushing power, as the PV source is powered down). That is, prior to activating the PV disconnect switch, power optimizers on the PV panels are turned off first. In this way, the actual load that the PV disconnect switch is breaking is reduced.

By having such a two-stage disconnect, where the PV portion of the power system is powered down prior to opening the PV disconnect switch, the arcs that the PV disconnect switch would have to handle would be smaller (or non-existent if the power is turned off completely beforehand), and a smaller switch with reduced size packaging may be used. In this way, the two-stage power shutdown de-stresses the PV disconnect switch. Such optimizations are available as the PV disconnect switch is integrated with the inverter. This is in contrast to using an off-the-shelf PV disconnect switch, which may be included in a variety of types of installations, and must assume in any given installation that it could be required to break a current/voltage load at its maximum rating in order to break any arcs that occur when opening under load.

One example of a multi-stage PV disconnect switch is as follows. For example, suppose that the PV disconnect switch is opened fully when it is turned a quarter turn. In some embodiments, as the user turns the switch, prior to being fully open (e.g., when the switch is turned $\frac{1}{8}^{th}$), the sense line is first broken (e.g., switch 230 is broken), causing the sense line to break (and triggering the microcontroller to deactivate the PV array). Thus, as the user is turning the disconnect switch, but before it is fully open, the PV array is deactivated. Once the user has reached the quarter turn position, the contacts between the PV source and the inverter are opened. Thus, the sense line has been broken before opening the contacts between the PV source and the inverter. This allows the microcontroller to deactivate the power optimizers prior to the contacts between the PV source and the inverter being opened.

As described above, opening of any of aforementioned switches 206, 218, and 220 will cause the sense line 216 to be broken, causing a change in the signal on the sense line, which is detected by microcontroller 214 and used to initiate disconnect procedures. Various types of disconnects, such as rapid shutdown, ESS disconnect, and PV disconnect, are facilitated by the microcontroller 214. For example, the microcontroller detects the signal on the sense line, and based on the signal, performs various functions, such as activating various switches, sending instructions to various components, etc.

For example, the microcontroller controls whether the AC output is turned on or off based on the state of the sense line. That is, the position of the AC relays is dependent on the state of the sense line, whether it is high or low. For example, if the sense line is in the low state, this is an indication that one or more of the switches (e.g., local on/off switch, PV disconnect switch, and/or e-stop switch) has been moved to the open position (thereby disrupting or breaking the sense line connection between the AUX power and the microcontroller, causing the sense line voltage to go low). In response to detecting the sense line going low, the microcontroller opens AC relays (by sending a control signal via AC enable line 226), thereby deactivating the AC output. In some embodiments, when the sense line goes low, the microcontroller also drops PV DC bus voltage by instructing optimizers to deactivate.

Thus, as shown in the examples herein, the microcontroller is a centralized processor that is configured to coordinate and control the actions of various components in the power system, such as relays, PV optimizers, etc., to effect a sequence of actions that facilitate multiple types of disconnect in response to activation of a single switch.

The following are further details regarding how activation or opening of a single switch facilitates multiple types of disconnect.

Array Rapid Shutdown: Rapid shutdown includes deactivation of inverters and/or optimizers so that there is no electricity coming from photovoltaic panels to a building. Further, power from the PV panels can no longer be outputted to the ESS. Rapid shutdown is performed, for example, for fire safety (e.g., to prevent arcing and reduce shock hazard for firefighters), and is required by the National Electric Code (NEC).

In various embodiments, actions to facilitate array rapid shutdown are initiated via the e-stop switch, the local on/off switch, the PV disconnect switch, or the microcontroller. In some embodiments, facilitating array rapid shutdown includes dropping PV DC bus voltage via PV optimizers.

As described above, in some embodiments, activating any of the PV disconnect switch, the remote e-stop switch, or the local on-off switch triggers the microcontroller to send a deactivation signal to PV optimizers, causing them to shut down, preventing power from a PV array to be provided to the inverter. The following are example scenarios in which opening of the switches triggers actions that facilitate rapid shutdown.

Rapid shutdown requires being able to be actuated from outside of the house. In some embodiments, if the ESS is installed within the house (e.g., within the garage), remote actuation is provided, to allow actuation of the rapid shutdown function from outside. For example, the E stop switch 218 may be used as an external trigger for rapid shutdown that is tied into the sense line logic. For example, the remote switch may be implemented as a breaker and be labeled as being used for rapid shutdown (so that a firefighter knows to trigger the switch, for example, by pressing on the breaker).

In some embodiments, activation of the external remote switch causes the enable line to change the signal to go low. This change in state is detected by the microcontroller. In response, the microcontroller causes the PV input from the PV panels to be turned off by sending a signal to the PV array (e.g., to the PV power optimizers) to shut off and engage rapid shutdown mode. This de-energizes the power system by turning off PV power coming into the PV inputs of the inverter. In some embodiments the inverter is also shutdown. Shutting down the inverter also satisfies the requirements of rapid shutdown.

As described above, in response to activation of the e-stop switch, the microcontroller also activates the AC relays 224 by opening them via a control signal sent via AC enable line 226. Activating the AC relays turns off the output of AC from the ESS.

Thus, the firefighter, while performing actions such as cutting, is protected by both shutting off the PV array, as well as preventing the battery pack/ESS from energizing the building.

The power system may be internally installed inside a building (e.g., in the garage of a home), or externally installed (e.g., on the outer walls of the home). In some embodiments, in an outdoor or external install, the power system includes a loop back or bypass, rather than an e-stop switch. In some embodiments, for example, if the power system is externally installed, rapid shutdown may also be initiated by opening the PV disconnect switch.

For example, as described above, opening the PV disconnect switch also causes the sense line to go low, which is detected by the microcontroller, which then, in response, turns off PV power. Thus, from an exterior installation point of view, not only does opening the integrated PV disconnect switch disconnect the PV power coming into the inverter (by opening the contacts between the PV output and the inverter), it also disables the energy coming directly from the PV panels. Backfeed up to the panels is also prevented. Further, by triggering the sense line, the inverter is turned off by the microcontroller. The microcontroller also causes the AC relays to flip, which turns off the AC output of the power system going to the building.

As shown in this example, the PV disconnect switch may also be leveraged as PV rapid shutdown equipment for outdoor installations. In some embodiments, the e-stop switch is a type of remote rapid shutdown initiator that is added outdoors for indoor inverter installations. As described above, the remote initiator may be wired and/or wireless, where triggering of the remote initiator causes software (e.g., microcontroller programming) to shut down the PV array (e.g., by turning off PV optimizers). In some embodiments, a DC disconnect (e.g., blade-style DC disconnect) is installed as a backup.

PV Disconnect: PV disconnect includes disconnecting the photovoltaic system from the inverter. PV disconnection may be performed for servicing, and is a requirement of the National Electric Code.

As one example, suppose that a user is servicing the inverter portion of the power system. The user actuates the integrated PV disconnect switch 206 to physically disconnect the PV input (e.g., by opening the contacts between the PV output and the inverter). As described above, in some embodiments, opening the PV disconnect switch also causes the sense line to go low (because the sense line between the AUX power supply and the microcontroller will go low when the line is broken, as shown in the example of FIG. 2). When the microcontroller detects that the sense line is low, the inverter drops the PV DC bus voltage via power optimizers, as described above. In response to detection of the breaking of the enable line, the microcontroller also activates or opens relays (e.g., AC relays 224, controlled via AC enable line 226) to disable the AC output. In some embodiments, a hardware shutdown line is activated that also shuts down the inverter in response to the PV disconnect switch being actuated.

The set of actions described above that are triggered in response to actuation of the integrated PV disconnect switch make the inverter unit safe and behave in a manner expected, for example, by an installer, without necessarily interrupting the DC power coming from the battery. One benefit of such a shutdown scheme (triggered based on actuation of the integrated PV disconnect switch) is that lower voltage components may continue to be powered, allowing for trouble shooting of logic, communications, etc. (that is, components could still be powered, but power would not be able to be pushed through the inverter with the PV disconnect switch).

ESS (energy storage system) Disconnect: ESS disconnect includes disconnecting the battery (e.g., DC from the panel or optimizers on the panels) from the inverter. The disconnection between the DC photovoltaic output and the inverter is performed for safety purposes (e.g., during servicing). For ESS disconnect, all conductors derived from the ESS should be disconnected. In the power system described herein, this is satisfied by disconnecting the output of the inverter.

In various embodiments, ESS disconnect is initiated with activation of the PV disconnect switch, the e-stop switch, the local on/off switch, or the microcontroller. In response to opening of any of the aforementioned switches, the power system described herein disconnects the output of the inverter by opening contacts to the main panel via the AC relay switches, thereby satisfying ESS disconnect.

As one example, suppose that a customer of the power system wishes to turn off their power system. In this example, the customer activates local on/off switch 220 that is outside of the inverter. In this example, activating the local on/off switch turns off the inverter. In this example, activating the local on/off switch triggers a mechanism or sequence of events similar to what is performed for rapid shutdown (although this shut down/disconnection need not be performed rapidly), where the microcontroller sends a signal to deactivate the PV optimizers. The AC relays 224 are also activated to turn off AC output as well (e.g., by the microcontroller sending a signal to the AC relays to open). In this way, from a customer use case point of view, the power system (including the solar PV array) is turned off.

In some embodiments, the ESS disconnect is also able to be activated from an exterior of a building (e.g., if the ESS is installed inside of the house, such as in the garage). As described above, using the sense line-based logic, triggering of the external switch also disables the AC output by opening the AC relays. In some embodiments, activation of the external remote switch causes the sense line to change (e.g., go from high to low, as described above), which the microcontroller detects, and in response, shuts down the inverter. Thus, in response to activation of any one of the switches described herein, a set of actions is triggered that satisfies the requirements of ESS disconnect, as power can no longer be pushed through the inverter.

Figure 3:
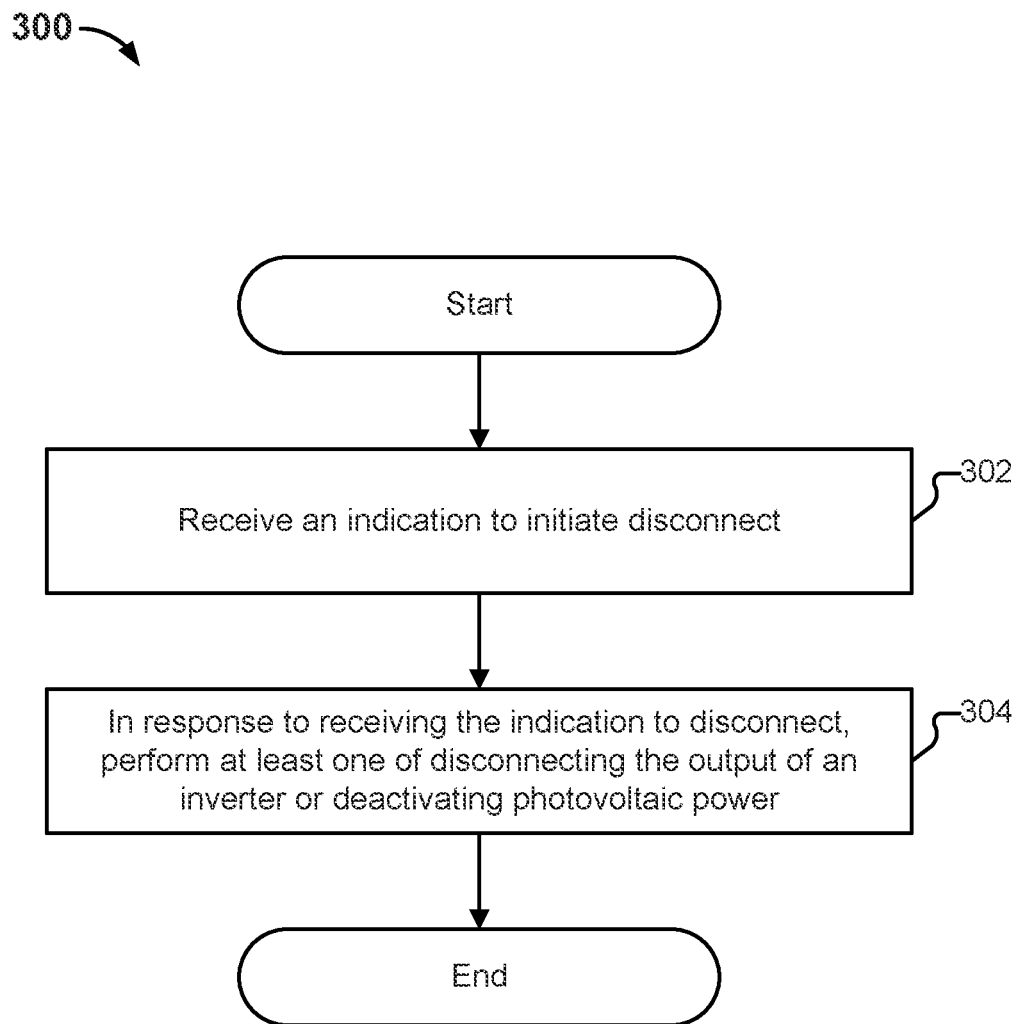
FIG. 3 is a flow diagram illustrating an embodiment of a process for coordinating disconnect.

FIG. 3 is a flow diagram illustrating an embodiment of a process for coordinating disconnect. In some embodiments, process 300 is executed by microcontroller 214 of inverter 202 of FIG. 2. The process begins at 302 when an indication to initiate disconnect is received. For example, activation of any of PV disconnect switch (206), local on/off switch (220), and e-stop switch (218) is detected. As described above, in some embodiments, the PV disconnect switch is integrated with an inverter. In some embodiments, the inverter includes inputs for receiving power from both an energy storage system (e.g., battery storage) and a photovoltaic system (e.g., array of solar panels).

As described above, in some embodiments, activation of any of the aforementioned switches causes a break in a sense line. The sense line is connected between a power source (e.g., AUX power 222) and the microcontroller. The AUX power supply provides a voltage (e.g., 12V or 24V). When the sense line is unbroken, the microcontroller will detect the AUX power supply voltage on the sense line. However, when the sense line is broken (due to any of the aforementioned switches being open), the voltage on the sense line then goes low. Detection of the low voltage is an example of an indication to initiate disconnect that is received by the microcontroller.

At 304, in response to receiving the indication to initiate disconnect, at least one of disconnecting the output of the inverter and/or turning off of the PV source is performed. Disconnecting the output of the inverter satisfies requirements for ESS disconnect. In some embodiments, turning off of the PV source by deactivating PV optimizers satisfies requirements of array rapid shutdown. In some embodiments, disconnecting the output of the inverter includes opening AC relays at the output of the inverter. In some embodiments, deactivating the PV optimizers includes sending a signal to the PV optimizers, which causes the PV DC bus voltage to drop. Thus, in some embodiments, activation of a single switch triggers a set of actions (disconnecting of the inverter output from a load of the inverter and/or deactivation of PV panel optimizers or converters) that facilitates both rapid shutdown and ESS disconnect.

As shown in the above example, integration of a PV disconnect switch in an inverter that receives power from both an ESS and a photovoltaic source allows for a single, centralized location from which multiple types of shutdown and disconnect functions may be coordinated in response to activation of a single switch. For example, a single PV disconnect switch integrated into the inverter is usable to facilitate both rapid shutdown and ESS disconnect (that is a single switch may be used to handle disconnect of both solar power, as well as battery power). For example, as described herein, the inverter further includes control logic, such as a microcontroller that provides a centralized location or single control point from which various components and subsystems of a power system, such as PV optimizers, battery functionality, inverter AC output, etc. are controlled.

Such centralized control and coordination as described herein is in contrast to existing power systems. For example, a typical power system installation is fragmented, with multiple boxes made by multiple different companies and parties. These individual components may have their own controls and may not be compatible with each other. This adds layers of complexity in both installation of a power system, as well as control of the various components (e.g., to provide the disconnect functions described above). For example, in an existing installation, a solar inverter may be part of its own system, while the battery system is its own separate system, where control or integration of these two different systems is challenging.

In addition to improved control of power system components, the integrated disconnect techniques described herein provide further improvements to existing power systems, and also address challenges with existing power systems such as installation complexity.

For example, with respect to installation, in existing systems, many different products must be combined together to create a power system. However, if there is some functionality that is not considered by an equipment manufacturer, then the burden is placed on the installer, electrical designers, and the local code jurisdiction to make individual custom, ad-hoc decisions and negotiations on how to install the power system in a manner that is in compliance with local codes. This may result in multiple different custom switches that must be installed. This results in a time-consuming installation process for existing systems that is also expensive and results in solutions that are not aesthetically pleasing. Further, the heterogeneous and fragmented nature of the components in existing installations, which are typically unique, leads to issues in having to design customized, individual solutions to allow compliance with the various types of disconnection required by regulations and codes. For example, typically, to implement a PV disconnect, an electrician or installer purchases a standalone disconnect switch, mounts it to the side of the house in its own box, and runs wire such as field wiring to connect all of the standalone components together in order to comply with codes and regulations. Such ad-hoc installation need not be performed using the integrated power system described herein.

Using the integrated power system and disconnect architecture described herein, disconnect functionality can be programmed at a single point, where the physical componentry is already integrated together, such that there are no compatibility issues, and installation can be simplified. As a further benefit of the disconnect architecture described herein, with a single control point for coordinating various functionality, the microcontroller may be easily programmed (e.g., via firmware updates) to accommodate various types of functionality for operation and to meet compliance requirements. For example, the programming of the microcontroller may be performed at the end of line manufacturing, so that all of the control logic would already be a part of the power system that is installed. This makes the installation process more efficient and predictable compared to existing solutions. For example, installers need not perform programming of firmware or logic sensing.

Thus, by using the disconnect architecture described herein, installation time is greatly reduced compared to existing power systems.

There are further benefits to the use of a single integrated PV disconnect switch that is used in common for multiple types of disconnect operations. For example, the use of such a single integrated PV disconnect switch limits the amount of labels and stickers that are needed. As the inverter with the integrated PV disconnect switch may be put in a single enclosure, where the integrated PV disconnect switch initiates multiple types of disconnects, a single sticker that includes all of the needed labels may be placed on the single enclosure. This is in contrast to a disparate system with various components in their own enclosures, which would need to be separately labeled at the appropriate locations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A power system, comprising:
an energy storage system (ESS);
a photovoltaic (PV) source;
an inverter capable of (1) receiving and sending power from the energy storage system, and (2) receiving power from the photovoltaic source; and
an integrated PV disconnect switch that is integrated with the inverter within a same enclosure and that, when opened, physically disconnects the inverter from the PV source, wherein opening of the integrated PV disconnect switch initiates shutdown of the PV source, wherein the integrated PV disconnect switch comprises a multi-stage switch, and wherein prior to disconnecting of the inverter from the PV source, a first stage of opening of the integrated PV disconnect switch initiates shutdown of the PV source.

2. The power system of claim 1, wherein opening of the integrated PV disconnect switch initiates disconnecting of an output of the inverter.

3. The power system of claim 2, wherein disconnecting of the output of the inverter comprises opening one or more Alternating Current (AC) relays.

4. The power system of claim 1, wherein the integrated PV disconnect switch is integrated with the inverter without field wiring.

5. The power system of claim 1, wherein the integrated PV disconnect switch is lockable.

\* \* \* \* \*